(12) United States Patent
Furukawa et al.

(10) Patent No.: US 8,555,152 B2
(45) Date of Patent: Oct. 8, 2013

(54) DOCUMENT MANAGEMENT SYSTEM AND ITS METHOD

(75) Inventors: Naohiro Furukawa, Tachikawa (JP); Hisashi Ikeda, Kunitachi (JP); Kosuke Konishi, Kokubunji (JP); Sunao Arai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1368 days.

(21) Appl. No.: 11/769,086

(22) Filed: Jun. 27, 2007

(65) Prior Publication Data
US 2008/0016455 A1 Jan. 17, 2008

(30) Foreign Application Priority Data

Jul. 11, 2006 (JP) .................................. 2006-189955

(51) Int. Cl.
*G06F 17/00* (2006.01)
(52) U.S. Cl.
USPC ........... 715/209; 715/200; 715/210; 715/255; 715/263; 715/273; 715/274; 715/770; 345/179
(58) Field of Classification Search
USPC ......... 715/263, 273, 274, 264, 200, 209, 210, 715/255, 770; 358/501; 345/179
See application file for complete search history.

(56) References Cited

U.S. PATENT DOCUMENTS

| | | | | |
|---|---|---|---|---|
| 5,737,740 | A * | 4/1998 | Henderson et al. ............ | 715/210 |
| 6,509,974 | B1 * | 1/2003 | Hansen .......................... | 358/1.12 |
| 6,867,765 | B2 * | 3/2005 | LeKuch et al. ................ | 345/173 |
| 7,009,594 | B2 * | 3/2006 | Wang et al. .................... | 345/156 |
| 7,009,612 | B2 * | 3/2006 | Hakamada .................... | 345/471 |
| 7,111,230 | B2 * | 9/2006 | Euchner et al. ............... | 715/232 |
| 7,134,606 | B2 * | 11/2006 | Chou ............................. | 235/494 |
| 7,502,509 | B2 * | 3/2009 | Sheets et al. .................. | 382/186 |
| 7,590,561 | B2 * | 9/2009 | Silverbrook et al. ........ | 705/26.1 |
| 7,639,876 | B2 * | 12/2009 | Clary et al. ................... | 382/186 |
| 7,720,286 | B2 * | 5/2010 | Clary ............................. | 382/187 |

(Continued)

FOREIGN PATENT DOCUMENTS

| | | |
|---|---|---|
| JP | 01/71473 | 9/2001 |
| JP | 2005-85155 | 3/2005 |

OTHER PUBLICATIONS

C. Liao et al., PapierCraft: A Command System for Interactive Paper (Proceedings of the Annual ACM Symposium on User Interface Software and Technology-UIST), Oct. 23, 2005, pp. 241-244, Seattle, WA, U.S.A.

(Continued)

*Primary Examiner* — Cesar Paula
*Assistant Examiner* — David Faber
(74) *Attorney, Agent, or Firm* — Mattingly & Malur, PC

(57) ABSTRACT

An electronic pasting method for pasting electronic data in consideration of printed and written data, including updating pasted data when electronic data is updated after it is pasted. The electronic pasting method uses a detecting unit and a paste information updating unit. The detecting unit detects a paste stroke made over two print sheets filled to denote a user's pasting action with which part or whole of a printed matter of electronic document information is pasted on printed matter, then detects the pasting action from a set of paste strokes, thereby obtaining a paste-from document, a paste-to document, and a paste position according to the pasting action detected by the detecting unit. The paste information updating unit updates the e-document, the printed matter information, and the written information according to the above paste information.

10 Claims, 12 Drawing Sheets

(56) References Cited

U.S. PATENT DOCUMENTS

| | | | |
|---|---|---|---|
| 7,843,590 B2 * | 11/2010 | Ikeda et al. | 358/1.15 |
| 8,169,423 B2 * | 5/2012 | Takeuchi et al. | 345/179 |
| 2002/0041290 A1 * | 4/2002 | LeKuch et al. | 345/775 |
| 2002/0149630 A1 * | 10/2002 | Kitainik et al. | 345/863 |
| 2002/0152240 A1 * | 10/2002 | Kitainik et al. | 707/517 |
| 2004/0064787 A1 * | 4/2004 | Braun et al. | 715/505 |
| 2004/0120013 A1 * | 6/2004 | Elkady et al. | 358/1.18 |
| 2004/0153969 A1 * | 8/2004 | Rhodes | 715/515 |
| 2005/0111044 A1 * | 5/2005 | Giannetti | 358/1.18 |
| 2005/0138541 A1 * | 6/2005 | Euchner et al. | 715/512 |
| 2005/0243369 A1 * | 11/2005 | Goldstein et al. | 358/1.18 |
| 2006/0136813 A1 * | 6/2006 | Hong et al. | 715/512 |
| 2007/0098263 A1 * | 5/2007 | Furukawa et al. | 382/181 |
| 2007/0208785 A1 * | 9/2007 | Hayashi et al. | 707/203 |
| 2008/0285070 A1 * | 11/2008 | Takeuchi et al. | 358/1.15 |
| 2009/0100044 A1 * | 4/2009 | Furukawa et al. | 707/5 |

OTHER PUBLICATIONS

Francois Guimbretiere, Paper Augmented Digital Documents (Proceedings of the Symposium on User Interface Software and Technology), Nov. 2-5, 2003, pp. 51-60, Vancouver, CN.

Wendy E. MacKay et al., The Missing Link: Augmenting Biology Laboratory Notebooks (Proceedings of the Symposium on User Interface Software and Technology), Oct. 27-30, 2002, pp. 41-50, XP-001171566, Paris, FR.

Ron B. Yeh et al., ButterflyNet: A Mobile Capture and Access System for Field Biology Research (Proceedings of the Conference on Human Factors in Computing Systems), CHI 2006, Apr. 22-27, 2006, pp. 571-580, XP-002494332, Montreal, CN.

* cited by examiner

| | | |
|---|---|---|
| USER ID | U0000456 | 301 |
| USER NAME | I. Bauer | 302 |
| PRINTING DEVICE ID | R0092747 | 303 |
| PEN ID | E0590562 | 304 |

| 400 | | |
|---|---|---|
| E-DOCUMENT ID | D0032154 | 401 |
| CREATING USER ID | U0000456 | 402 |
| DATE OF CREATION | 2005/11/26 12:05:25 | 403 |
| DATE OF UPDATING | 2006/06/08 13:13:41 | 404 |
| E-DOCUMENT DATA | ABC_231252.PDF | 405 |
| NUMBER OF PAGES | 2 | 406 |
| PRINT ID | P0054213 | 407 |

| 450 | | |
|---|---|---|
| E-DOCUMENT ID | D0044852 | 451 |
| CREATING USER ID | U0000789 | 452 |
| DATE OF CREATION | 2006/06/08 11:45:20 | 453 |
| DATE OF UPDATING | 2006/06/08 11:45:20 | 454 |
| E-DOCUMENT DATA | DEF_524125.PDF | 455 |
| NUMBER OF PAGES | 4 | 456 |
| PRINT ID | P0066508 | 457 |

FIG. 5

| | | |
|---|---|---|
| 500 | PRINT ID | P0054213 |
| | PRINT SOURCE E-DOCUMENT ID | D0032154 |
| | PRINTING USER ID | U0000456 |
| | PAPER ID | I0014295<br>I0014296 |
| | DATE OF PRINTING | 2006/06/08 13:15:11 |
| | DATE OF UPDATING | 2006/06/10 18:32:15 |
| | PERMITTED USER ID | U0000123<br>U0000456<br>U0000789 |
| | NUMBER OF PRINT SHEETS | 2 |
| | PRINTING CONDITION | D0032154::P1(0, 0)-(210, 297)→<br>I0014295::(0, 0)-(210, 297),<br>D0032154::P2(0, 0)-(210, 297)→<br>I0014296::(0, 0)-(210, 297) |
| | PEN STROKE ID | S0005235<br>S0007343<br>S0007345<br>S0007346<br>S0007348 |
| | PASTE-FROM ID | C0005235 |
| | PASTE-TO ID | - |

Labels: 501, 502, 503, 504, 505, 506, 507, 508, 509, 510, 511, 512

| | | |
|---|---|---|
| 550 | PRINT ID | P0054220 |
| | PRINT SOURCE E-DOCUMENT ID | D0044852 |
| | PRINTING USER ID | U0000789 |
| | PAPER ID | I0014302 |
| | DATE OF PRINTING | 2006/06/08 13:17:11 |
| | DATE OF UPDATING | 2006/06/10 18:32:15 |
| | PERMITTED USER ID | U0000123<br>U0000456<br>U0000789 |
| | NUMBER OF PRINT SHEETS | 1 |
| | PRINTING CONDITION | D0044852::P1(0, 0)-(210, 297)→<br>I0014302::(10, 10)-(100, 141),<br>D0044852::P2(0, 0)-(210, 297)→<br>I0014302::(110, 10)-(200, 141),<br>D0044852::P3(0, 0)-(210, 297)→<br>I0014302::(10, 151)-(100, 287),<br>D0044852::P4(0, 0)-(210, 297)→<br>I0014302::(110, 151)-(200, 287) |
| | PEN STROKE ID | S0007344<br>S0007347 |
| | PASTE-FROM ID | - |
| | PASTE-TO ID | C0005235 |

Labels: 551, 552, 553, 554, 555, 556, 557, 558, 559, 560, 561, 562

FIG. 6

| | | |
|---|---|---|
| PAPER ID | I0014295 | 601 |
| PRINT ID | P0054213 | 602 |
| PAGE NO. | 1 | 603 |

| | | |
|---|---|---|
| PASTE ID | C0005235 | 701 |
| PASTE-FROM ID | P0054213 | 702 |
| PASTE-TO PRINT ID | P0054220 | 703 |
| DATE OF PASTING | 2006/06/10 18:32:15 | 704 |
| PASTING USER ID | U0000456 | 705 |
| PASTE PATTERN | RECTANGLE | 706 |
| PASTE CONDITION | I0014295::(53, 73)-(158, 219)→<br>I0014302::(53, 73)-(158, 219) | 707 |
| ROTATION | 0° | 708 |
| PASTE PEN STROKE ID | S0007343<br>S0007344<br>S0007345<br>S0007346<br>S0007347<br>S0007348 | 709 |
| PASTE TYPE | DYNAMIC / STATIC CLIPPING | 710 |

700

| | | |
|---|---|---|
| 1300 | PASTE ID | * | 701
| | PASTE-FROM ID | P0054213 | 702
| | PASTE-TO ID | * | 703
| | DATE OF PASTING | * | 704
| | PASTING USER ID | * | 705
| | PASTE PATTERN | RECTANGLE | 706
| | PASTE CONDITION | I0014295: : (53, 73)-(158, 219)→ *: : (53, 73)-(158, 219) | 707
| | ROTATION | 0° | 708
| | PASTE STROKE ID | * | 709
| | PASTE TYPE | DINAMIC_CLIPPING | 710

DOCUMENT MANAGEMENT SYSTEM AND ITS METHOD

CLAIM OF PRIORITY

The present application claims priority from Japanese application JP 2006-189955 filed Jul. 11, 2006, the content of which is hereby incorporated by reference into this application.

FIELD OF THE INVENTION

The present invention relates to a system and its method for managing document information, more particularly to an information management technique employed for a case in which a document is pasted on another document.

BACKGROUND OF THE INVENTION

Even today when electronic technologies are developed significantly, paper documents are still used in great quantities in offices, etc. The main reasons are considered to be the following merits; (1) low price, (2) easy to write on, (3) possible to refer to many sheets simultaneously, and (4) easy and quick reference by means of "turning the pages". Furthermore, if paper document information such as information printed and/or written on paper can be managed electronically in computers, users could come to enjoy not only the convenience of such paper, but also the multifunctional properties of such computers.

In recent years, it has become easy to electronize information written on paper. Particularly, there has been lately realized a pen-type input device (digital pen) and put to practical use. The pen-type input device obtains a locus of its pen tip on paper as electronic data. The digital pen can input the obtained locus of the pen tip to a computer. For example, there is a digital pen developed by Anoto Inc., in Sweden. International Unexamined Patent Application Publication No. 01/71473 discloses the details of the digital pen. The digital pen can be used easily even by users who are not accustomed to the use of keyboards and mice. This is why the digital pen is expected to be employed in various fields, for example, in document management not only at windows of local governmental offices for applications and requests to services, but also in other offices of companies, etc. With a progress of such input devices, it has become very easy now to electronize information written on paper.

Under such circumstances, the first consideration is how paper is used actually now? In offices, schools, etc., it is often seen that a sheet of paper is pasted on another sheet of paper. For example, a graph is created with use of a spreadsheet software program and printed out on a sheet of paper, then the graph is clipped and pasted on a page of a notebook. Hereunder, a sheet of paper to be pasted on another sheet of paper just like the graph described above will be referred to as a "paste-from document". And the paper on which the paste-from document is to be pasted just like the notebook described above will be referred to as a "paste-to document". And to realize the merits of both the paper and the spreadsheet software described above, a document management technique corresponding to such a pasting work is needed.

As a document management technique that takes consideration to such a pasting work, for example, JP-A No. 2005-085155 discloses a conventional technique. According to the technique, a sheet of paper on which a dot pattern is printed out is used. The dot pattern identifies a position of a digital pen on the paper. When a writing error of the digital pen is detected, a sheet of correction paper on which only a dot pattern is printed is pasted on the error position, thereby correcting the writing error. Thus the written electronic data is updated correctly in accordance with the pasting work.

In the case of the conventional technique, however, the correction paper to be pasted is blank and it is not expected that the paper to be pasted already includes written/printed data.

The conventional technique also includes a problem that the pasting work corresponds only to written electronic data. Actually, however, a paste-from document and a paste-to document often include such printed data as a graph, etc. and such printed information must also be pasted together to manage paper documents electronically; otherwise, the electronical document management cannot be done perfectly. In addition, to realize such perfect electrical document management, the management technique is also required to correspond to diversified printing forms such as scaling printing, as well as N-up printing that prints out plural sheets on a sheet of paper collectively.

If e-document data to be assumed as a printing source is updated after paper pasting, how the consistency is to be kept in the document management data is also a problem. Such a problem arises, for example, in a case in which a graph is pasted on a notebook as described above, then an error is found in the pasted graph data, so that the electronic data is corrected with use of a spreadsheet software program.

In some cases, the size and shape of a subject paste-from document, as well as the pasting position of the paste-to document may already be known clearly with respect to a pasting work type. For example, such a case will come under a pasting work of a regular format label seal having a notebook owner name and the notebook serial number printed on the cover of the notebook. The conventional technique cannot cope with such a simplified pasting work easily. This has been a problem.

SUMMARY OF THE INVENTION

Under such circumstances, the present invention has been made to solve the conventional problems as described above.

Concretely, it is the first object of the present invention to provide an electronically pasting method for managing document information in pasting works by pasting a paste-from document on a paste-to document even electronically in consideration of printed and written data individually.

It is the second object of the present invention to provide a method for updating electronically pasted data together with its original e-data in case the original e-data is updated after it is pasted.

Furthermore, it is the third object of the present invention to provide a simple method for pasting data electronically by simplifying the pasting work when a relationship between a paste-from document and a paste-to document is known clearly.

Hereunder, typical one of the objects disclosed in this specification will be described as follows.

In order to achieve the first object, according to one aspect of the present invention, the document management system capable of managing and reading e-document information, its printed matter information, and user written information includes a paste stroke detecting unit for detecting a paste stroke made over two printed matters filled to denote a user's pasting work from among stored paste stroke information upon pasting part or whole of a printed matter on another printed matter; a pasting work detecting unit for detecting a pasting work from a set of paste strokes detected by the paste stroke detecting unit; a paste information extracting unit for obtaining a paste-from document, a paste-to document, and a paste position according to the pasting work detected by the pasting work detection unit; and a paste information updating unit for updating an e-document, printed matter information, and written information according to the paste information. The document management system electronizes such a pasting work.

According to another aspect of the present invention, the document management system includes a print information memory unit for storing print information denoting one of the areas of one of the pages of a subject paper document on which each area of an e-document is printed out upon printing the e-document; and a paste information updating unit for updating an e-document, printed matter information, and written information according to the print information of the paste-from and paste-to documents upon detecting a pasting work. Thus the document management system can cope with diversified printing forms such as scaling printing, as well as N-up printing for printing plural sheets on one sheet collectively.

In order to achieve the second object, the document management system also includes a dynamic clipping information updating unit for creating an image of a subject document on which the pasting work is done, dynamically from the paste information when the subject document is read after pasted contents of an e-document assumed as a paste-from or paste-to document are updated. Thus the system can also update pasted data even after pasted electronic data is updated.

To achieve the third object, any of the document management systems described above includes a paste information template specified before some of the paste information items are pasted; a pasting work detecting unit corresponding to the paste information template and detecting data for filling the template; and a paste information extracting unit corresponding to the paste information template and creating paste information by implementing information that is not specified for the paste information template, according to the detected pasting work when the pasting work detecting unit corresponding to the paste information template determines that the information matches with the paste information template. Thus the system can simplify the pasting work when a relationship between a paste-from document and a paste-to document is known clearly.

According to the present invention, because pasted data can also be managed electronically with paper pasting works convenient and familiar to the user, the user can enjoy both convenience of paper and diversified functions of the computer.

BRIEF DESCRIPTION OF THE DRAWINGS

FIG. 4 shows a data structure of e-document information;
FIG. 5 shows a data structure of print information;
FIG. 6 shows a data structure of paper ID information;
FIG. 7 shows a data structure of paste information.

DETAILED DESCRIPTION OF THE PREFERRED EMBODIMENTS

At first, a system configuration and a data structure will be described. Then, an example of a pasting work will be described. And finally, details of each processing will be described.

Figure 1:
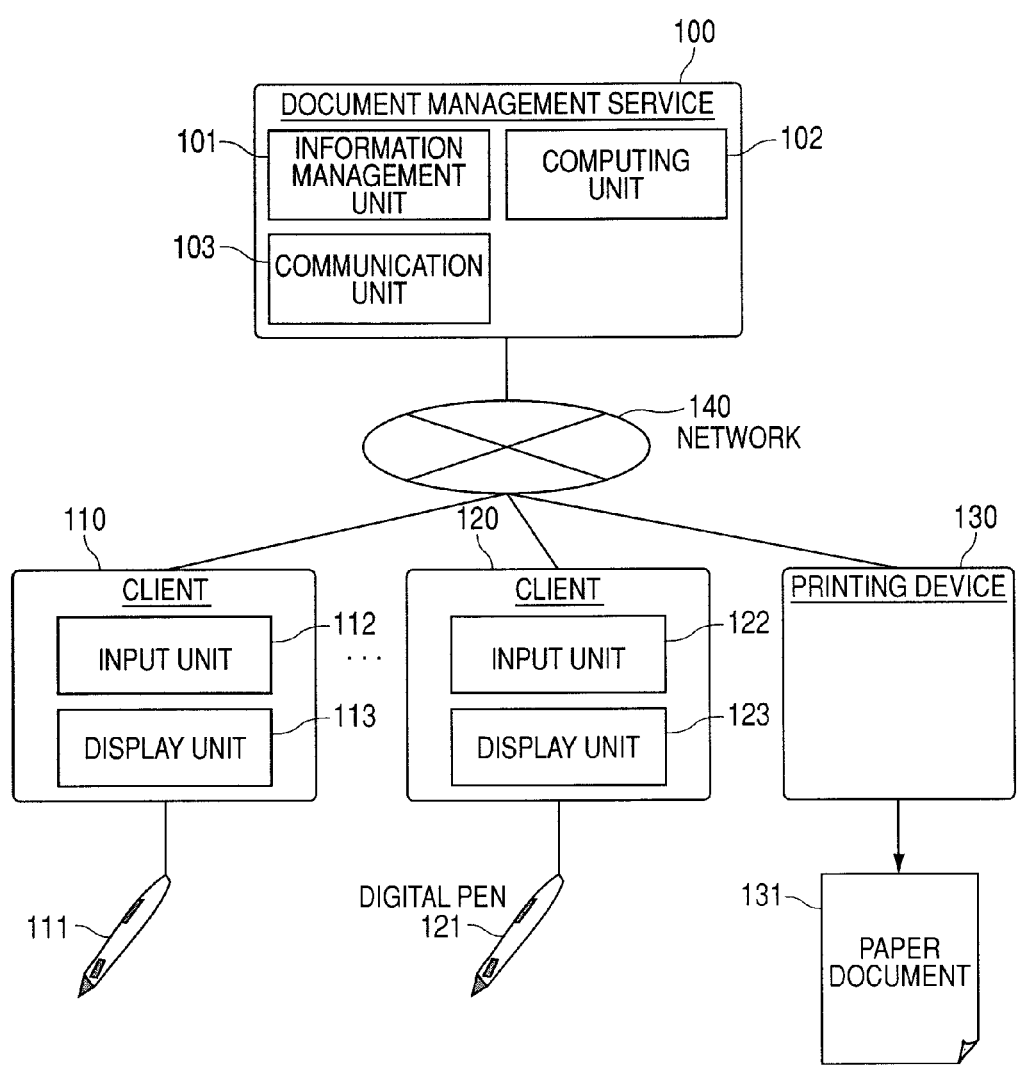
FIG. 1 is a configuration of a document management system of the present invention.

The document management system of the present invention is composed as shown in FIG. 1. The system is connected to a document management server 100 for managing the information of the whole system and one or more clients 110 and 120 that are user terminals of the system through a network 140. Each client is connected to a digital pen 111/121 that is a device for writing data on a paper medium. In addition, a printing device 130 for printing document data on a paper medium is also connected to the network 140 and the printing device 130 outputs a paper document 131 according to a user's print request.

Figures 2, 3:
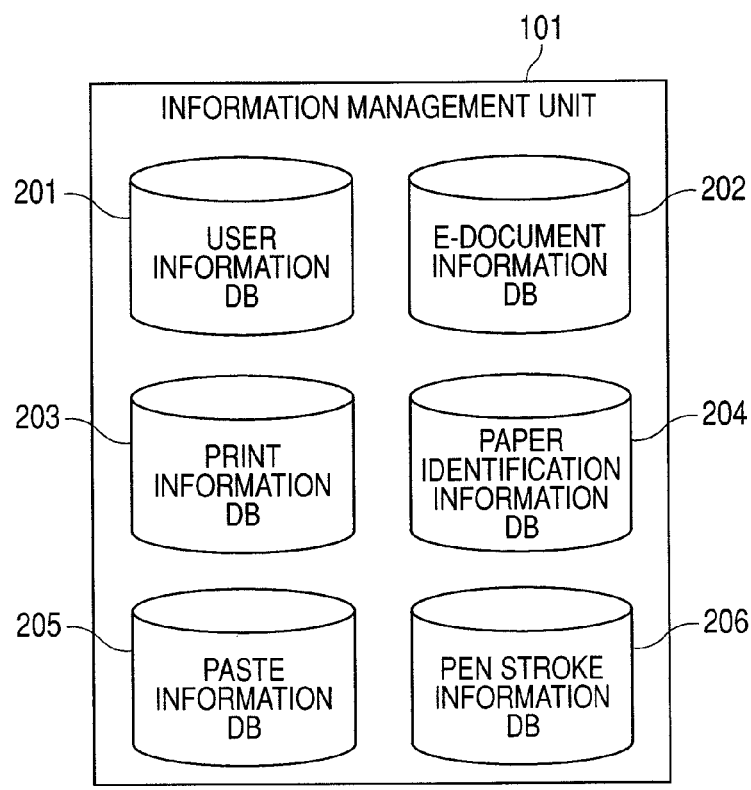
FIG. 2 is a configuration of an information management unit of the present invention.
FIG. 3 shows a data structure of user information.

The information management unit 101 of the document management server 100 manages/stores documents and user database and other various databases that are (as shown in FIG. 2) user information DB 201 for managing user-related information; e-document information DB 202 for managing information related to e-documents; a print information DB 203 for managing information of print conditions for printing e-documents on paper media; a paper ID information DB 204 for managing information of used paper individual number (paper ID); a paste information DB 205 for managing information related to pasting works; and a stroke information DB 206 for managing stroke information written on documents with use of a digital pen. The document management server 100 also includes a computing unit 102 for executing various types of operations and a communication unit 103 for executing data communication with the clients and the printing device through the network 104.

Each client includes an input unit 112/122 for accepting user operations such as print requests, e-document editing, etc. with use of a keyboard (not shown), a mouse (not shown), a digital pen 111/121, or the like, as well as a display unit 113/123 for reading images of documents stored in the information management unit and checking results of print requests, etc.

In this embodiment, it is assumed that one or more clients are connected to the document management server as described above. Even in case where only one client is connected to the server (stand-alone type), the processings are the same as those in this embodiment. In that case, part of the information managed in the information management unit 101 It may also be managed/stored by the client.

In this embodiment, it is assumed that the digital pen disclosed in International Unexamined Patent Application Publication No. 01/71473 is used as means for obtaining user hand-writing data. However, another means or a combination of some means may be used to obtain both paper ID and hand-writing strokes. For example, it is possible to combine a means for printing a bar-code that means a paper ID on a sheet of paper, then scanning it to obtain the paper ID and a means for capturing a writing stroke made by the user on a sheet of paper with use of a tablet device provided under the paper, thereby obtaining both paper ID and hand-writing stroke. In this embodiment, it is assumed that the present invention uses a digital pen that can obtain both paper ID and user's handwriting stroke simultaneously. For this processing, the user is just required to write on a sheet of paper.

Next, the data structure will be described. Reference numeral 300 shown in FIG. 3 denotes an example of user information stored in the user information DB 201. The user information example 300 stores items of user ID 301, user name 302, user's printing device ID 303, and user's digital pen ID 304.

Each of reference numerals 400 and 450 shown in FIG. 4 denotes the e-document information 202. The e-document information 400 stores items of e-document information ID 401/451; the e-document creating user ID 402/452; date of the e-document creation 403/453; last date of the e-document updating 404/454; e-document contents 405/455; total number of pages 406/456; ID of print information 407/457 that includes print conditions for printing the e-document. In this embodiment, it is assumed that the contents of each e-document is represented in the PDF format and the file name is stored in the e-document data 405/455. The e-document information 400/450 is created for each e-document created originally as one e-file. In this embodiment, it is assumed that part of paper on which an e-document D0032154 is pasted on another paper on which an e-document D0044852 is printed.

Examples of print information 203 are shown with reference numerals 500 and 550 in FIG. 5. The print information stores items of print information ID 501/551; ID 502/552 of an e-document to be assumed as a print source; printing executing user ID 503/553; printed matter ID 504/554; date of printing 505/555; last date of printed data updating; printed matter usable user ID 507/557; total number of sheets 508/558; print condition 509/559; writing stroke ID 510/560; paste information ID 511/561 when subject printed matter is used as a paste-from document; and subject paste information ID 512/562 when subject printed matter is used as a paste-to document. The print condition 509 denotes a subject area of a subject paper medium of a subject page on which contents of an e-document are printed. For example, "D0032154::P1 (00)-(210,297)->10014295::(0,0)-(210,297)" means that the contents within a rectangle (0 mm, 0 mm)-(210 mm, 297 mm) on the first page of an e-document of which ID is D0032154 are printed within a range (0 mm, 0 mm)-(210 mm, 297 mm) of a paper medium of which ID is 10014295. The print condition 559 means 4-up printing in which 4 pages of an e-document are printed on one page collectively (see paper document 913 shown in FIG. 9).

Reference numeral 600 in FIG. 6 denotes an example of a paper ID information 204. The example of the paper ID information 600 stores items of paper ID 601; its related print information ID 602; and the page number 603 of the identified paper in a print processing.

Reference numeral 700 in FIG. 7 denotes an example of the paste information 205. The example of the paste information 700 stores items of paste information ID 701; print information ID 702 used to print a paste-from document; print information ID 703 used to print a paste-to document; date of pasting 704; pasting user ID 705; pattern of the paste-from document 706; pasting condition 707; inclination (clockwise: positive) of the paste-from document in the paste-to document 708; pasting stroke ID 709; and pasting type 710 meaning a type of consistency in pasted e-data. The pasting condition 707 denotes a positional relationship in a pasting work between a paste-from document and a paste-to document with respect to their ranges on their paper media. In this embodiment, in order to simplify the description, it is assumed that the paste pattern 706 is limited only to a rectangle. The paste type 710 specifies one of DYNAMIC_CLIPPING and STATIC_CLIPPING. The DYNAMIC_CLIPPING means updating an e-image generated according to the paste information 700 if an e-document is updated after it is pasted. The STATIC_CLIPPING means keeping an e-image generated according to the paste information 700 as is even if an e-document is updated after it is pasted.

Figure 8:
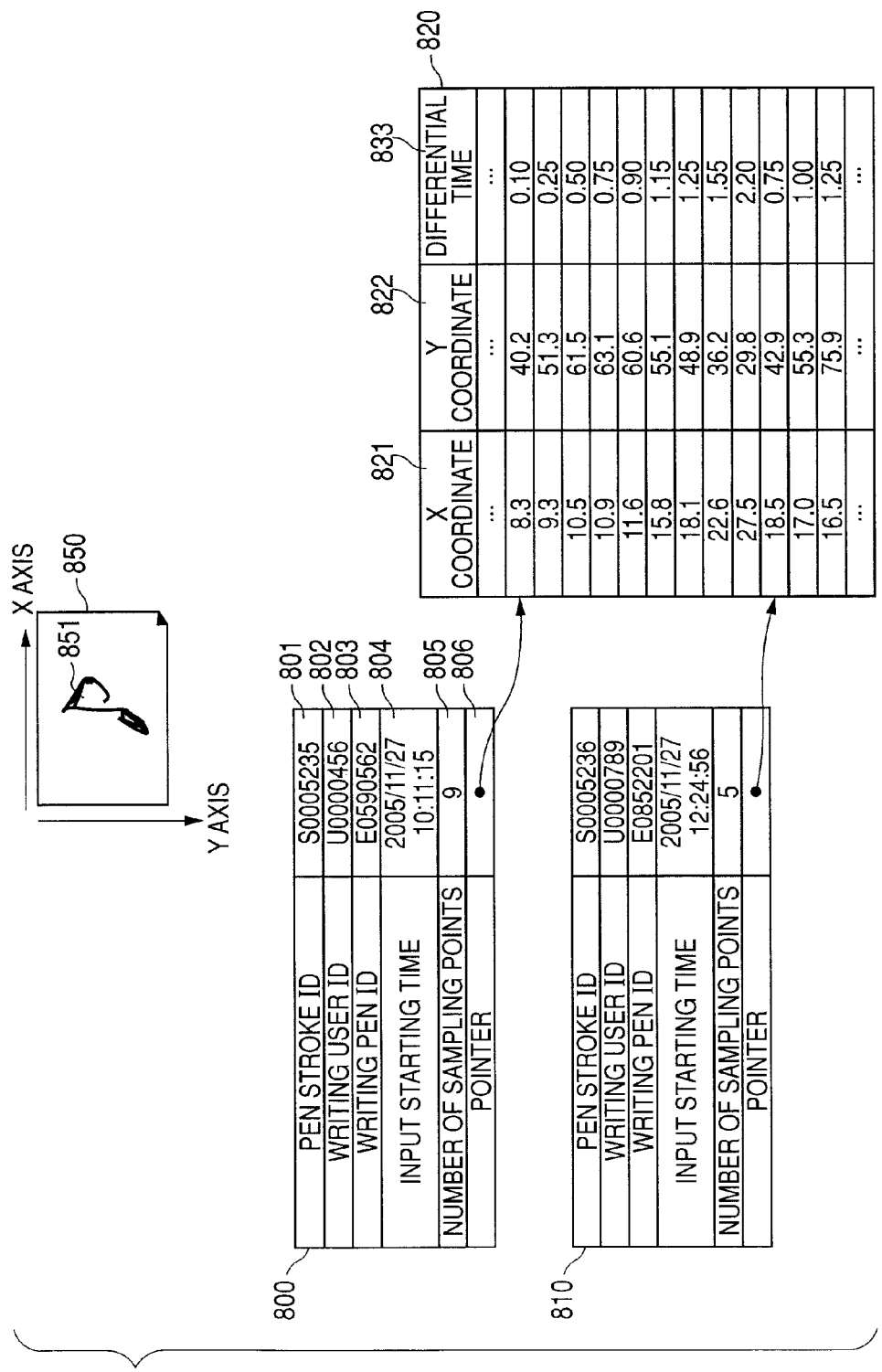
FIG. 8 shows a data structure of stroke information.

FIG. 8 shows an example of the stroke information 206. The stroke 851 on the document 850 shown in FIG. 8 is represented by the information described in the items 801 to 806. The item 801 is an ID for identifying a subject stroke. The item 802 is an ID of a user who has made the stroke. The item 803 is an ID of a pen used for the stroke. The item 804 denotes a starting time of the stroke. The item 805 denotes the number of sampling points existing in the stroke. Table 820 holds each sampling point information. The item 806 denotes a pointer of the head of a set of sampling points that includes a subject sampling point. Each sampling point has XY coordinate values 821 and 822 on a document and reference numeral 823 denotes a difference between the sampling point describing time and the stroke starting time described in the item 804. Each of other strokes has its information represented in the data structure shown in Table 810. Even for a hand-written letter inputted by an input device other than the digital pen, the letter is decomposed into strokes and each stroke information can be managed with reference to the table 820 that holds each stroke information such as the stroke ID, the number of sampling points, the pointer, and the coordinate values.

Figure 9:
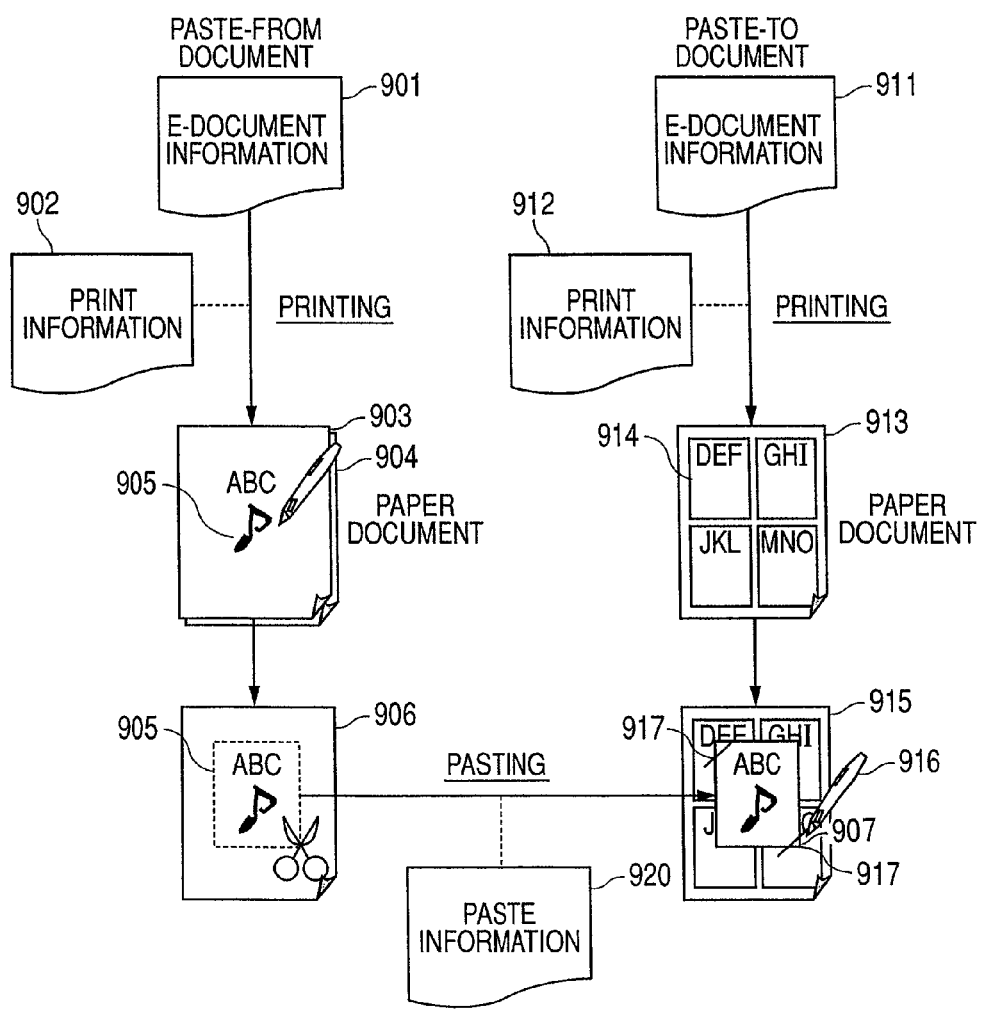
FIG. 9 shows an example of a pasting work flow.
Figure 10:
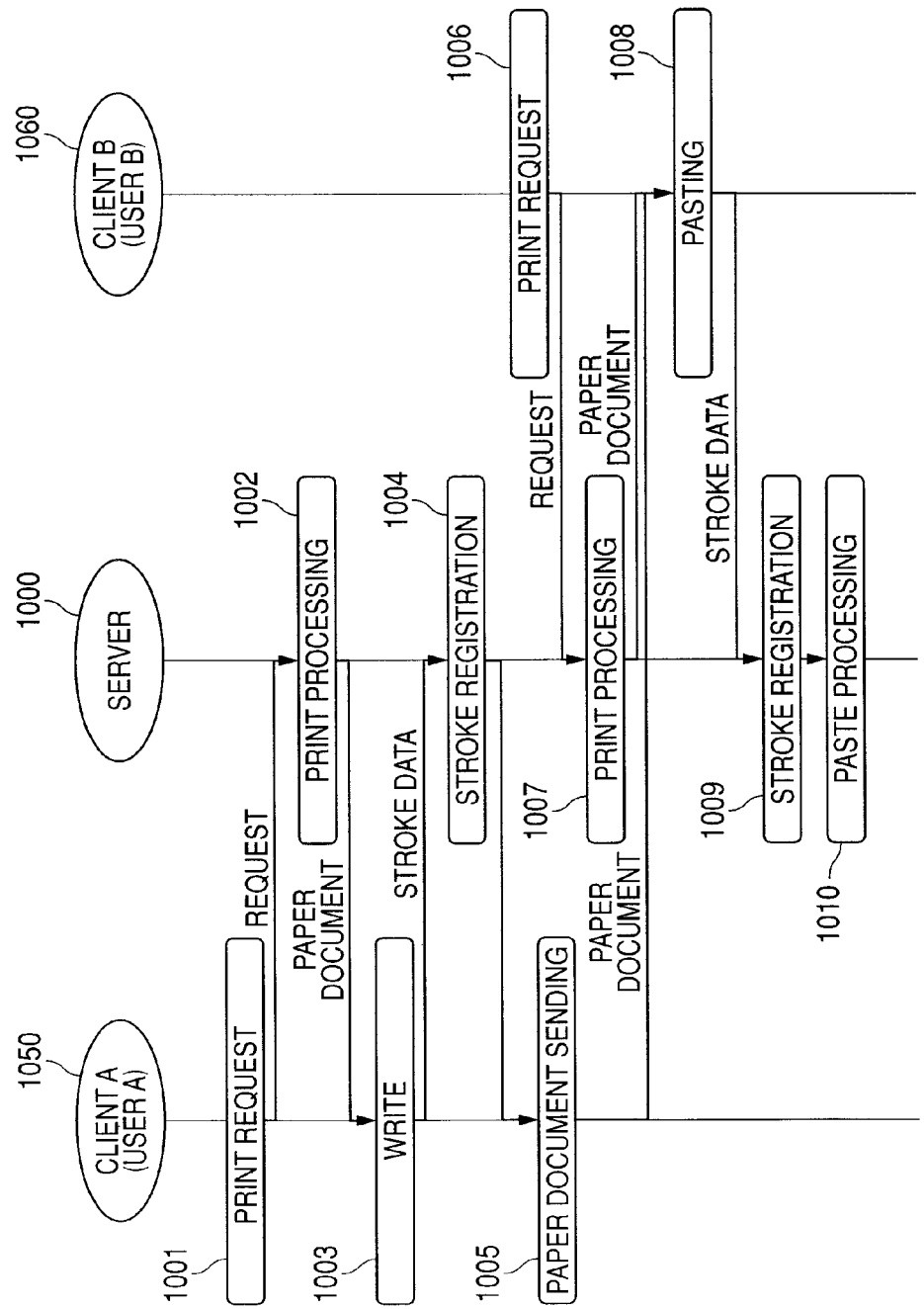

Next, a pasting work flow will be described with reference to FIGS. 9 and 10. Here, the e-document information 901 is assumed as a paste-from document. Table 400 in FIG. 4 shows data contents of the e-document information 901. At first, a user A having a user ID U0000456 issues a print request (step 1001). The request is transferred to a server and the server executes a print processing 1002. Print conditions created as a result of the processing 1002 are assumed now as print information 902 and a printed matter 903. Table 500 in FIG. 5 shows the data contents of the print information 902. On each paper medium of the printed matter 903 is printed a dot pattern denoting the paper ID and the paper position as disclosed in International Unexamined Patent Application Publication No. 01/71473. Then, the user A makes a writing stroke 905 with use of the pen 904 (step 1003). The stroke is transmitted to the server and registered therein as stroke information (step 1004). Table 800 in FIG. 8 shows the contents of this stroke information 905. Then, the user A passes the first page 906 of the printed matter 903 to another user B (user ID: U0000789)(step 1005).

On the other hand, the e-document information 911 is assumed as a paste-to document and Table 450 in FIG. 4 shows the data contents. At first, the user B issues a print request (step 1006). The request is transmitted to the server and the server executes a print processing 1007. Print conditions created as a result of the processing 1007 are assumed now as print information 912 and a printed matter 913. Table 550 in FIG. 5 shows the contents of the print information 912. Then, the user B executes a pasting work 1008. The user B clips only the first page 906 of the printed matter 903 with use of a pair of scissors. Reference numeral 907 denotes the clipped part and reference numeral 915 denotes a part of the paste-to document on which the clipped part 907 is pasted. At this time, the user B made a paste stroke to record the pasting work with use of the pen 916 and reference numeral 917 denotes the paste stroke. This stroke information is transmitted from the pen to the server and registered therein (step 1009). Upon registering the stroke information, each pasting work is detected (as to be described later) just after the pasting. Thus the pasting work of the user B is detected here and a paste processing 1010 is executed. The paste information 920 is recorded information of this pasting work. Table 700 in FIG. 7 shows the contents of the paste information. This completes the description of the pasting work flow.

Figure 11A:
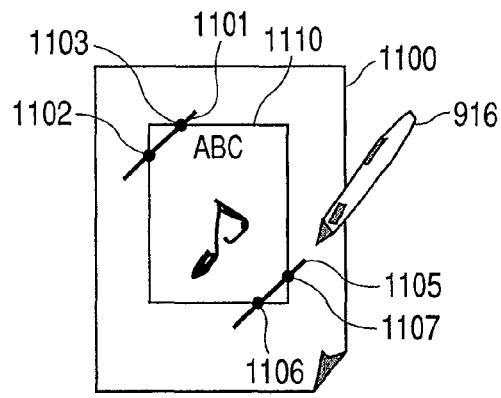
FIGS. 11A-11C are examples of a paste stroke.
Figure 11B:
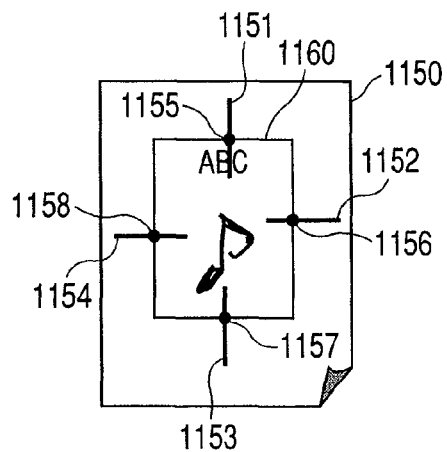

FIG. 11 shows an example of a paste stroke denoting a pasting work. In this embodiment, a paste stroke is assumed as a set of line segments, each of which always goes through one or more sides of a paste-from document. For example, in FIG. 11A, two line segments 1101 and 1105 that go through two sides respectively are assumed as paste strokes. Paste information such as a size of a rectangle 1110/1160/1190 of a paste-from document 1100/1150/1180, a pasting position and an inclination of a paste-to document can be identified from the coordinates of the intersecting points 1102, 1103, 1106, and 1107 and the linearity of the paste stroke. In FIG. 11B, the four line segments 1151, 1152, 1153 and 1154 become paste strokes. Even in this case, the paste information can be obtained from the coordinates of the intersecting points 1155, 1156, 1157 and 1158 and the linearity of the paste stroke. It is assumed here that the user describes all those paste strokes consecutively.

Next, how to obtain paste information concretely will be described. At first, a range of a subject rectangle for pasting a paste-from document is determined from the maximum and minimum values of all the sampling points of all the paste strokes described on the paste-from document. If it is assumed that a set of all the sampling points is S and a sampling point is s(x,y)∈S, the coordinates of the four corners of the paste-from document rectangle become as follows.
(min(x), min(y))-(max(x), min(y))-(max(x), max(y))-(min(x), max(y)) (∀p(x,y)∈S)

Figure 15:
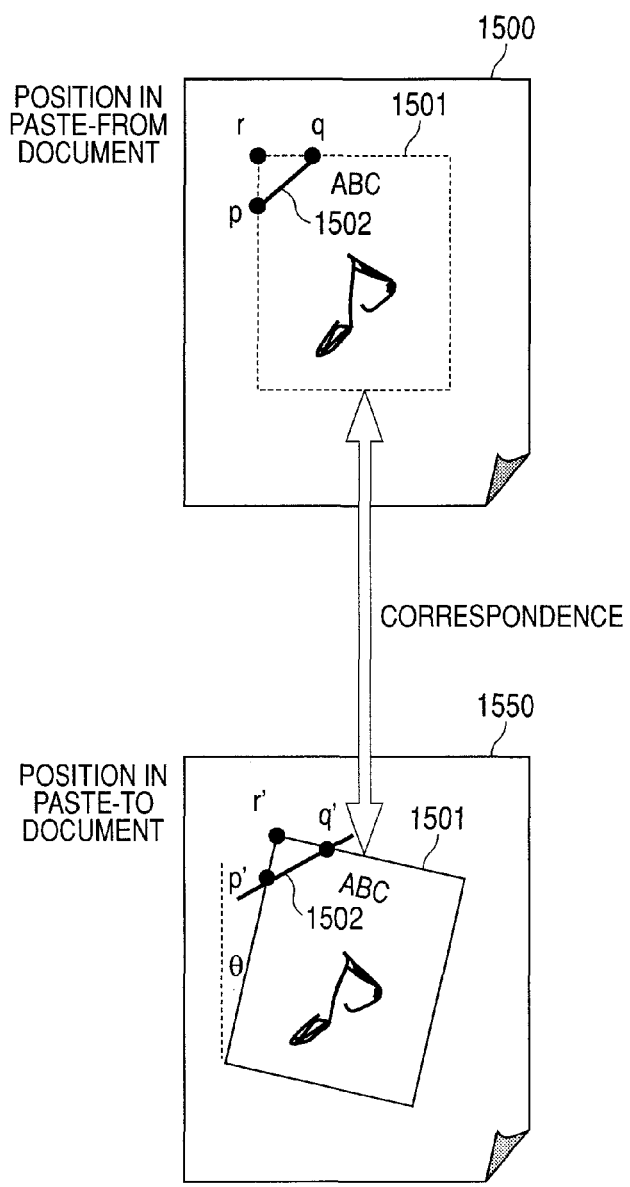
FIG. 15 is a diagram for describing a relationship between a paste document and another.

Next, a description will be made for the coordinates of the four corners of the rectangle 1501 with reference to FIGS. 15A and 15B. At first, coordinate values of p, q, r, p', q', and r' are determined as shown in FIGS. 15A and 15B. All the coordinate values except for that of r' can be obtained from the paste strokes 1502 made on the paste-from and paste-to documents 1500/1550 and the values of the paste-from document rectangle 1501. And the r' coordinate values can be obtained from those determined coordinate values.

Here, p and p' are put one upon the other. This means that if the coordinates of both p and p' are the same, the cosine of the inclination θ of the paste-from document in the paste-to document 1550 is calculated as follows.

$$\cos\theta = \frac{\overrightarrow{pq} \cdot \overrightarrow{p'q'}}{|\overrightarrow{pq}| \cdot |\overrightarrow{p'q'}|} = \frac{\overrightarrow{pq} \cdot \overrightarrow{p'q'}}{|\overrightarrow{pq}|^2} \quad \text{(Expression 1)}$$

Then, the relationship among p, p', and θ is calculated as follows.

$$\cos\theta = \frac{\overrightarrow{pr} \cdot \overrightarrow{p'r'}}{|\overrightarrow{pr}| \cdot |\overrightarrow{p'r'}|} = \frac{\overrightarrow{pr} \cdot \overrightarrow{p'r'}}{|\overrightarrow{pr}|^2} \quad \text{(Expression 2)}$$

The above two expressions are coupled to obtain the following.

$$\overrightarrow{p'r'} \quad \text{(Expression 3)}$$

Because the coordinate of p' is already known, the r' value can be obtained from the coordinate of the p'. Similarly, the coordinates of other four corners of the paste-to document 1550 can be calculated sequentially to obtain each value of the paste conditions 707.

Figure 11C:
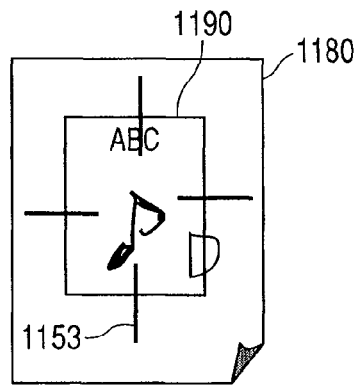
Figure 12:
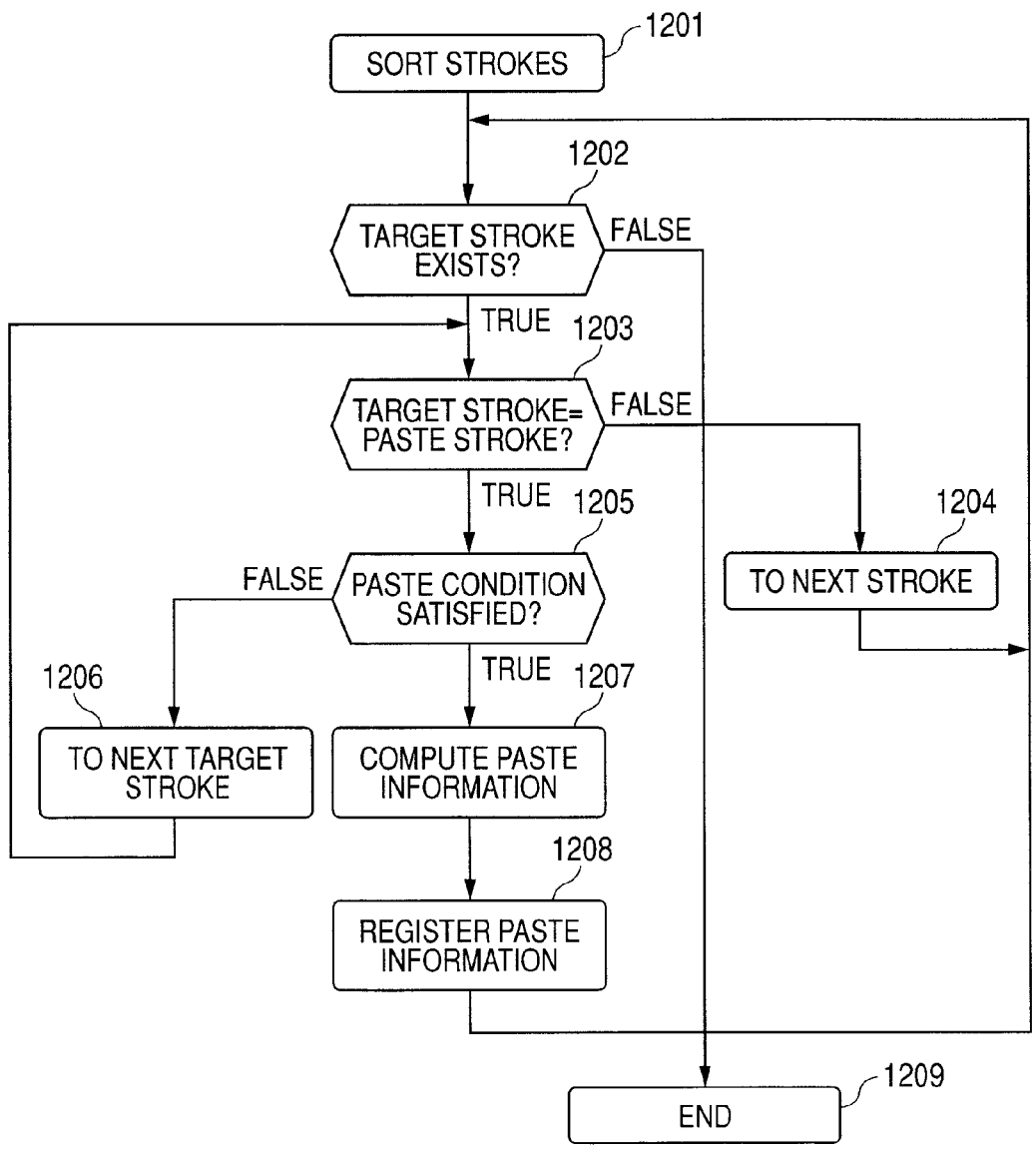
FIG. 12 is a flowchart of a pasting detection processing.

Next, a paste detection processing will be described with reference to FIG. 12. The paste detection is made on the basis of a principle that upon detecting strokes at the coordinates corresponding to printed matters 903 and 913 at consecutive times, those strokes can be estimated as a series of strokes made while the printed matters 903 and 913 are put one upon the other as shown in FIGS. 11A-C, that is, estimated as a paste stroke. As described above, this processing is executed just after a stroke registration processing. At first, strokes to be registered are sorted in a description time sequence (step 1201). Then, strokes are checked sequentially (step 1202) and a subject stroke and the stroke following the subject one are subjected to a check for whether or not the time difference between the last sampling point of the subject stroke and the first sampling point of the next stroke is within □ and those two strokes are described on two sheets of paper having different paper IDs (step 1203). Those strokes become candidates of the paste stroke. If they are determined not to be paste strokes, the third stroke is assumed as another subject stroke (step 1204) and determined similarly according to a result of a check of the above items. This processing is repeated until a paste stroke is detected. If a paste stroke is detected, the next stroke is targeted (step 1206) and the similar detection is repeated. In this way, paste stroke candidates are detected continuously. If an intersecting point exists at each side of the paste-from document, those paste stroke candidates are determined right and it is assumed as completion of paste detection (step 1205), then paste information is calculated from the paste stroke information (step 1207). After that, the obtained paste information is registered in the paste information DB provided in the information management unit (step 1208). The above processings are executed for every stroke registered newly. Upon completing all those checks, the paste detection processing is ended (step 1209). The □ is set as a value equivalent to a reference of the sampling rate of the digital pen.

Next, static clipping and dynamic clipping will be described. For example, in the example shown in FIG. 9, a letter string on a paste-from document of a paste document 915 is "ABC". Here, it is assumed that the contents of the paste-from document 901 are changed from "ABC" to "XYZ" after the document 901 is pasted. At this time, if the paste document 915 is read on a client display unit, the letter string "ABC" is displayed on the paste-from document in the case of the static clipping. On the other hand, in the case of the dynamic clipping, the letter string is changed to "XYZ". These two types of management methods are specified at a place and this place determines a paste type denoted by the item 710 shown in FIG. 7.

Here, a description will be made for procedures for generating an e-image on the basis of paste information 700 in each of the static clipping and the dynamic clipping. The flow is almost the same between the static and dynamic clippings; receiving an input of a request for reading an e-image, the computing unit refers to various types of information stored in the information management unit to generate the e-image. At first, each of the print information 500 and 550 is obtained from the paste-from print ID 702 and the paste-to print ID 703 of the paste information 700. And the e-document information 400 and 450 can be obtained from the print-from e-information ID 502 and 552 described in the print information 500 and 550 respectively. In addition, an entire e-image of each document can be obtained from the items of each e-document data 406 and 455. After that, because a geometrical relationship between the paste-from document and the paste-to document can be obtained from the paste condition 707, the subject e-image of the paste-from document can be overwritten in the subject paste range on the paste-to document e-image to create an e-image of the subject paste document.

In spite of this, there is still a difference between the static clipping and the dynamic clipping. In the case of the static clipping, upon creating paste information, e-information of both paste-from document and paste-to document at that time is stored beforehand. In other words, upon creating paste information, if STATIC_CLIPPING is specified for the paste type 710, print information 500 and 550 corresponding to the paste-from and paste-to documents at that time, as well as e-document information 400 and 450 corresponding to the paste-from and paste-to documents and the e-document data described in the items 405 and 455 are copied respectively. Each copied item of the print information 500 and 550 is changed so that the copies of the e-document information 400 and 450 are referred to, then each of the copied items 405 and 455 of the e-document information 400 and 450 is changed so that the copy of each e-document data is referred to. In this way, those copied e-document data are stored separately from the original e-document information, thereby the pasting work time e-image can be stored even when the original e-document is updated.

This paste type is specified, for example, as follows. (1) It is specified from a client input unit upon pasting, upon reading a paste document, or upon updating an e-document. (2) It is specified by describing a code of a paste type separately from a paste stroke in a pasting work. Upon such a specification, it is just required to add a paste type code identification processing to the step 1207 (paste information computing).

Assume now that part of paste information such as a size of a paste-from document and a paste position on a paste-to document is specified and known clearly. At that time, it is also assumed to create paste information including some items written before the pasting work as shown in Table 1300 in FIG. 13. Hereinafter, such paste information will be referred to as a paste information template. In the example of Table 1300 shown in FIG. 13, it is assumed that a paste-from document, its paste position, a paste pattern, and a paste type are specified beforehand. The *-marked position is to have proper data when pasting is detected later. And it is easy to relate a pasting detection processing to a paste information template. In a standard processing with respect to the paste condition in step 1205, a set of paste strokes that go through each side of a paste-from document is found. In that case, it is just required to add a step of determination for whether or not there is any other paste stroke that can satisfy the paste information template.

Figures 13, 14:
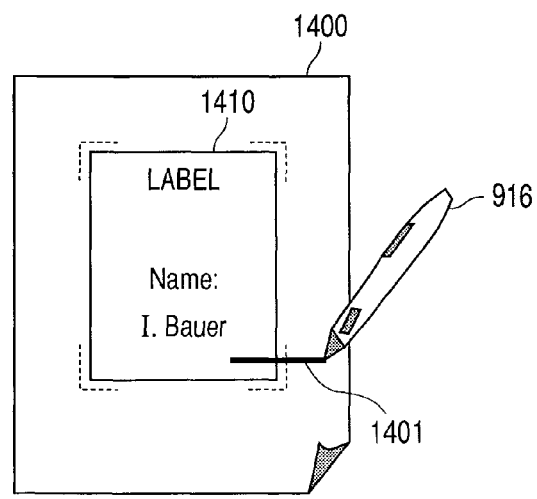
FIG. 13 shows a data structure of a paste information template.
FIG. 14 shows an example of a simple pasting work.

For example, assume now that the table 1300 is specified as a paste information template and only one paste stroke 1401 is described in the template 1400 as shown in FIG. 14. Because the paste position 1410 and the size are already specified in the template, the template of the table 1300 is fulfilled only with the paste stroke 1401, thereby the pasting is detected. In case where a pasting relationship is clear In this way, the use of the paste information template will enable the user to specify pasting easily.

Such a paste information template creating method can also be specified from a client input unit upon printing a paste-from or paste-to document.

The present invention can therefore apply to document management systems. Particularly, the present invention is effective for each document management system for managing documents by relating paper, e-data, and pen-written data to each another.

What is claimed is:

1. A document management system, comprising:
an information management unit for storing document information of an e-document printable on paper;
an input unit for accepting pen stroke information written on said paper and transferring said information to said information management unit; and
a computing unit,
wherein, upon creating a paste document on paper by pasting a paste-from printed document that is part or whole of a first e-document printed matter on a paste-to printed document that is a second e-document printed matter, said computing unit detects a paste stroke made over said paste-from printed document and said paste-to printed document from a pen stroke inputted from said input unit, where the paste stroke is a set of line segments, each of which goes through one or more sides of said paste-from printed document on said paste-to printed document,
wherein said computing unit detects, as a pasting work, said paste-from printed document, said paste-to printed document and a paste position of said paste-from printed document on said paste-to printed document from a set of said detected paste strokes, and
wherein said computing unit stores said paste-from printed document, said paste-to printed document, and said paste position information that are related to each other as paste information with respect to said detected pasting work.

2. The document management system according to claim 1,
wherein said computing unit stores print information denoting one of the pages and one of the areas of said printed matter on which each area of said e-document is printed, in said information management unit upon printing said first and second e-documents, and
wherein said computing unit, upon detecting said pasting work, updates said e-document, printed matter information, and written information according to said print information of said paste-from printed document and said paste-to printed document.

3. The document management system according to claim 1,
wherein said computing unit, upon updating contents of said e-document to be assumed as an original of a paste-from or a paste-to document after detecting a pasting work, accepts an input of a read request for said paste document, refers to document information of said e-document of which contents are updated, according to said paste information, and creates an image of said paste document updated with contents of said updated e-document.

4. The document management system according to claim 1,
wherein said computing unit, upon detecting said pasting work and a specified static clipping attribute, copies document information of said e-document to be assumed an original of said paste-from document and said paste-to document, and stores said copied document information in said information management unit as a reference destination of said paste document information.

5. The document management system according to claim 1,
wherein said information management unit holds a paste information template specified before at least some of items of said paste information are pasted, and wherein said computing unit, upon detecting said pasting work, detects data that fills said paste information template together with said pasting work and creates paste information by complementing information not specified for said paste information template according to said detected pasting work upon determining that said detected pasting work matches with said paste information template.

6. A document managing method employed for a document management system including an information management unit for storing document information of an e-document printable on paper and an input unit for accepting pen stroke information written on said paper and transferring said information to said information management unit, said method comprising:
- a first step of detecting a paste stroke made over a paste-from printed document and a paste-to document from a digital pen stroke inputted from said input unit upon creating a paste document on paper by pasting a said paste-from printed document that is part or whole of a first e-document printed matter on said paste-to printed document that is a second e-document printed matter, where said paste stroke is a set of line segments, each of which goes through one or more sides of said paste-from document,
- a second step of detecting, as a pasting work, said paste-from printed document, said paste-to printed document and a paste position of said paste-from printed document on said paste-to printed document from a set of said detected paste strokes; and
- a third step of storing said paste-from printed document, said paste-to printed document, and said paste position information that are related to each other in said information management unit as paste information with respect to said detected pasting work.

7. The method according to claim 6, further comprising:
a fourth step of storing print information denoting one of pages and one of areas of said printed matter on which each area of said e-document is printed, upon printing said first and second e-documents; and
a fifth step of updating said e-document, printed matter information, and written information according to said print information of said paste-from printed document and said paste-to printed document upon detecting said pasting work.

8. The method according to claim 6, further comprising:
receiving an input of a read request for said paste document and referring to document information of an e-document of which content is updated, according to said paste information, and creates an image of said paste document updated with updated contents of said e-document upon updating of contents of an e-document to be assumed as an original of a paste-from document or a paste-to document after detecting a said pasting work.

9. The method according to claim 6,
wherein in a case where a static clipping attribute is specified in said third step, copying document information of an e-document to be assumed as an original of said paste-from printed document and said paste-to printed document and stores said copied information in said information management unit as a reference destination of said paste document information.

10. The method according to claim 6,
wherein said information management unit holds a paste information template specified before at least some of said paste information items are pasted,
wherein said information management unit detects data that fills said paste information template in said second step, and
wherein said information management unit creates paste information by implementing information that is not specified for said paste information template according to said detected pasting work upon determining that said detected pasting work matches with said paste information template.

* * * * *